United States Patent
Hariman et al.

(10) Patent No.: US 7,598,715 B1
(45) Date of Patent: Oct. 6, 2009

(54) APPARATUS AND METHOD FOR REVERSE CURRENT CORRECTION FOR A SWITCHING REGULATOR

(75) Inventors: George A. Hariman, Sunnyvale, CA (US); Faruk Jose Nome Silva, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 386 days.

(21) Appl. No.: 11/696,648

(22) Filed: Apr. 4, 2007

(51) Int. Cl.
  *G05F 1/59* (2006.01)
(52) U.S. Cl. .................. 323/271; 323/222; 323/285
(58) Field of Classification Search .......... 323/222, 323/271, 282, 283, 284, 285
See application file for complete search history.

(56) References Cited

U.S. PATENT DOCUMENTS

| | | | |
|---|---|---|---|
| 5,731,731 A | 3/1998 | Wilcox et al. |
| 5,912,552 A | 6/1999 | Tateishi |
| 6,091,234 A | 7/2000 | Kitagawa |
| 6,346,798 B1 | 2/2002 | Passoni et al. |
| 6,476,589 B2 | 11/2002 | Umminger et al. |
| 6,490,183 B2 | 12/2002 | Zhang |
| 6,603,671 B2 | 8/2003 | Tokunaga et al. |
| 6,661,208 B2 | 12/2003 | Rutter et al. |
| 6,674,268 B2 | 1/2004 | Rutter et al. |
| 6,683,441 B2 | 1/2004 | Schiff et al. |
| 6,696,821 B2 | 2/2004 | Haraguchi et al. |
| 6,841,977 B2 | 1/2005 | Huang et al. |
| 6,894,468 B1 | 5/2005 | Bretz et al. |
| 6,909,619 B2 | 6/2005 | Saeki et al. |
| 7,045,992 B1 | 5/2006 | Silva et al. |
| 7,109,688 B1 | 9/2006 | Chiu et al. |
| 7,119,524 B2 | 10/2006 | Bretz et al. |
| 7,482,795 B2 * | 1/2009 | Parto et al. ................ 323/284 |
| 2008/0157732 A1 * | 7/2008 | Williams ................... 323/266 |

OTHER PUBLICATIONS

LTC 1873: Dual 550kHz Synchronous 2-Phase Switching Regulator Controller with 5-Bit VID, Linear Technology, 1999, pp. 1-32.
LTC 3406-1.5/LTC3406-1.8: 1.5MHz, 600mA Synchronous Step-Down Regulator in ThinSOT, Linear Technology Corporation, 2002, pp. 1-16.
Maxim: Low-Noise, 14V Input, 1A, PWM Step-Down Converters, MAX1684/MAX1685, Maxim Integrated Products, 2001, pp. 1-14.
Peterchev, Angel V. et al., "Digital Multimode Buck Converter Control With Loss-Minimizing Synchronous Rectifier Adaptation," IEEE Transactions on Power Electronics, Nov. 2006, vol. 21, No. 6, pp. 1-12.
Mappus, Steve "Application Report: SLUA281 Predictive Gate Drive™ Boosts Synchronous DC/DC Power Converter Efficiency," Texas Instruments, Apr. 2003, pp. 1-26.
Acker, Brian et al., "Synchronous Rectification with Adaptive Timing Control," Department of Electrical Engineering and Computer Sciences, Jun. 1995, pp. 88-95.
Blanc, James, "Practical Application of Mosfet Synchronous Rectifiers," Siliconix Incorporated, Nov. 1991, pp. 495-501.
Smith, Marvin W. et al., "Improving the Efficiency of Low Output Voltage Switched-Mode Converters with Synchronous Rectification," Proceedings of Powercon7, Mar. 24-27, 1980, pp. 1 - 1 5.

(Continued)

*Primary Examiner*—Jeffrey L Sterrett
(74) *Attorney, Agent, or Firm*—Darby & Darby P.C.; Matthew M. Gaffney

(57) ABSTRACT

A synchronous switching voltage regulator circuit is provided. After the first PWM pulse or at the end of a soft-start, a gradual transition is made from asynchronous rectification to fully synchronous rectification, or vice versa. During the gradual transition, the error voltage is level-shifted down to correct for error caused by reverse current through the body diode of the main switch.

20 Claims, 16 Drawing Sheets

OTHER PUBLICATIONS

Deuty, Scott "Exploring the Options for Distributed and Point of Load Power in Telecomm and Network Applications," Semtech Corporation, 2004, pp. 223-229.

Kagan, Richard S. et al., "Improving Power Supply Efficiency With Mosfet Synchronous Rectifiers," Proceedings of Powercon9, Power Concepts, Inc., 1982, pp. 1-7.

Nowakowski, R. "PoL Position," Electronic Design (Europe) Online, Sep. 2005, pp. 1-6.

Morrison, David "Low-Cost PFC Design Meets Regulatory Standards," Power Electronics Technology, Aug. 2005, pp. 1-6.

Gutierrez, Neil "Hot Swap with Confidence: LM5069 Positive Hot Swap Controller," National Semiconductor, Oct. 2006, pp. 1-43.

LM3495 Emulated Peak Current Mode Buck Controller for Low Output Voltage, National Semiconductor Apr. 2006, pp. 1-26.

LM3743 N-Channel FET Synchronous Buck Controller for Low Output Voltages, National Semiconductor, Sep. 2006, pp. 1-23.

Delta Electronics Introduces the S48SP Into Their Delphi Series of Board Mounted DC/DC Power Converters, Delta, May 10, 2004, Taiwan, pp. 1.

LSN2 Series: Non-Isolated, DOSA-SIP, 6/10/16A Selectable-Output DC/DC Converters, Datel Technologies Company, pp. 1-14.

LM5116 Wide Range Synchronous Buck Controller, National Semiconductor Corporation, Feb. 2007, pp. 1-26.

Faruk, Nome et al., "The Challenge of Pre-Biased Loads and the Definition of a New Operating Mode for DC-DC Converters," National Semiconductor Corporation, pp. 1-7.

'Highly Cost-Effective POL Converters, Power Electronics Technology, Sep. 7, 2005. pp. 1-3.

* cited by examiner

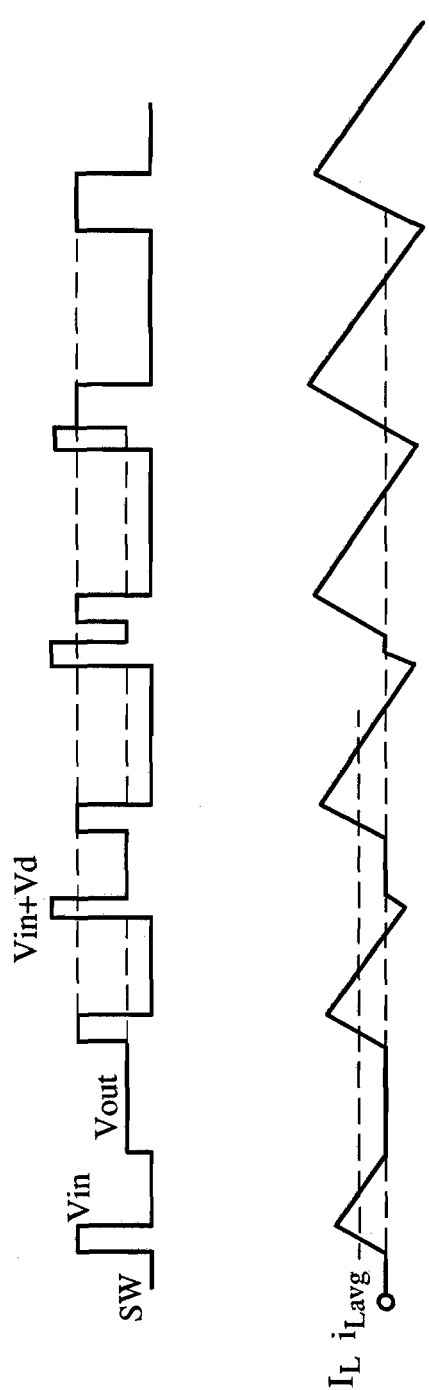
FIG. 5A  SCTL1
FIG. 5B  SCTL2
FIG. 5C  SW, Vin, Vout, Vin+Vd
FIG. 5D  $I_L$, $i_{Lavg}$

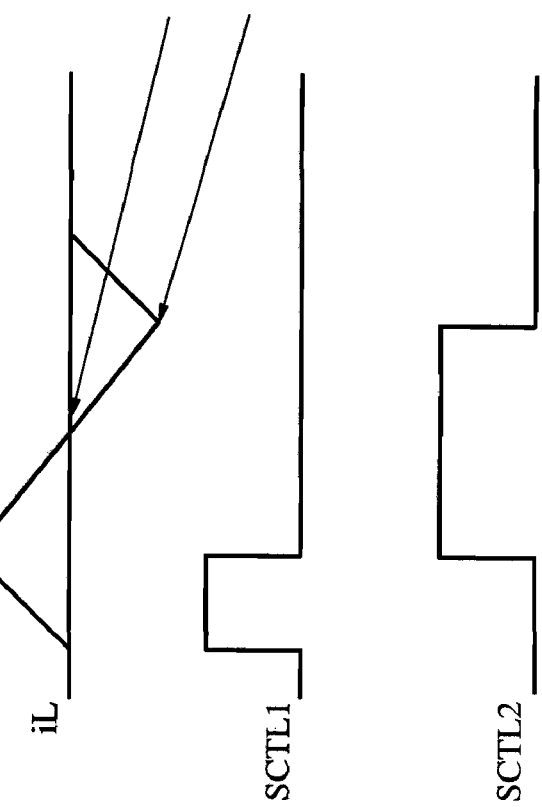
When SCTL2 is on and inductor current went negative this means that the next pulse on SW node corresponds to the period when the inductor current ramps up via the HS body diode
FIG. 12A  SW
FIG. 12B  iL
FIG. 12C  SCTL1
FIG. 12D  SCTL2

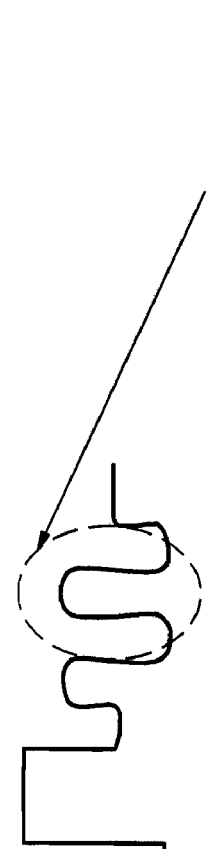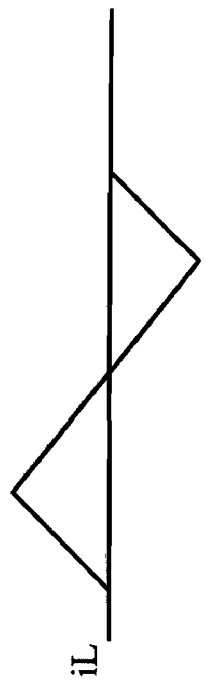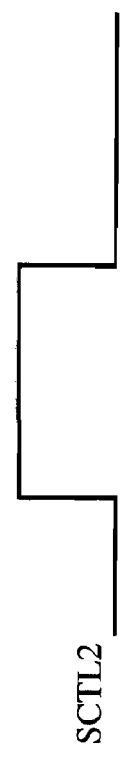
FIG. 13A SW — SW node will tend to ring after inductor current hits 0A.
FIG. 13B iL
FIG. 13C SCTL1
FIG. 13D SCTL2

APPARATUS AND METHOD FOR REVERSE CURRENT CORRECTION FOR A SWITCHING REGULATOR

FIELD OF THE INVENTION

The invention is related to switching voltage regulators, and in particular, but not exclusively, to an apparatus and method for feed-forward voltage loop correction for reverse current in a switching regulator during transition conduction mode (TCM).

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which:

FIGS. 5A-5D show timing diagrams of waveforms of embodiments of signal SCTL1, signal SCTL2, signal SW, and current $I_L$, respectively, for an embodiment of the circuit of FIG. 4;

FIGS. 12A-12D show timing diagrams of waveforms of embodiments of signals for an embodiment of the circuit of FIG. 11;

FIGS. 13A-13D illustrate timing diagrams of waveforms of embodiments of signals for an embodiment of the circuit of FIG. 11;

DETAILED DESCRIPTION

Figure 1:
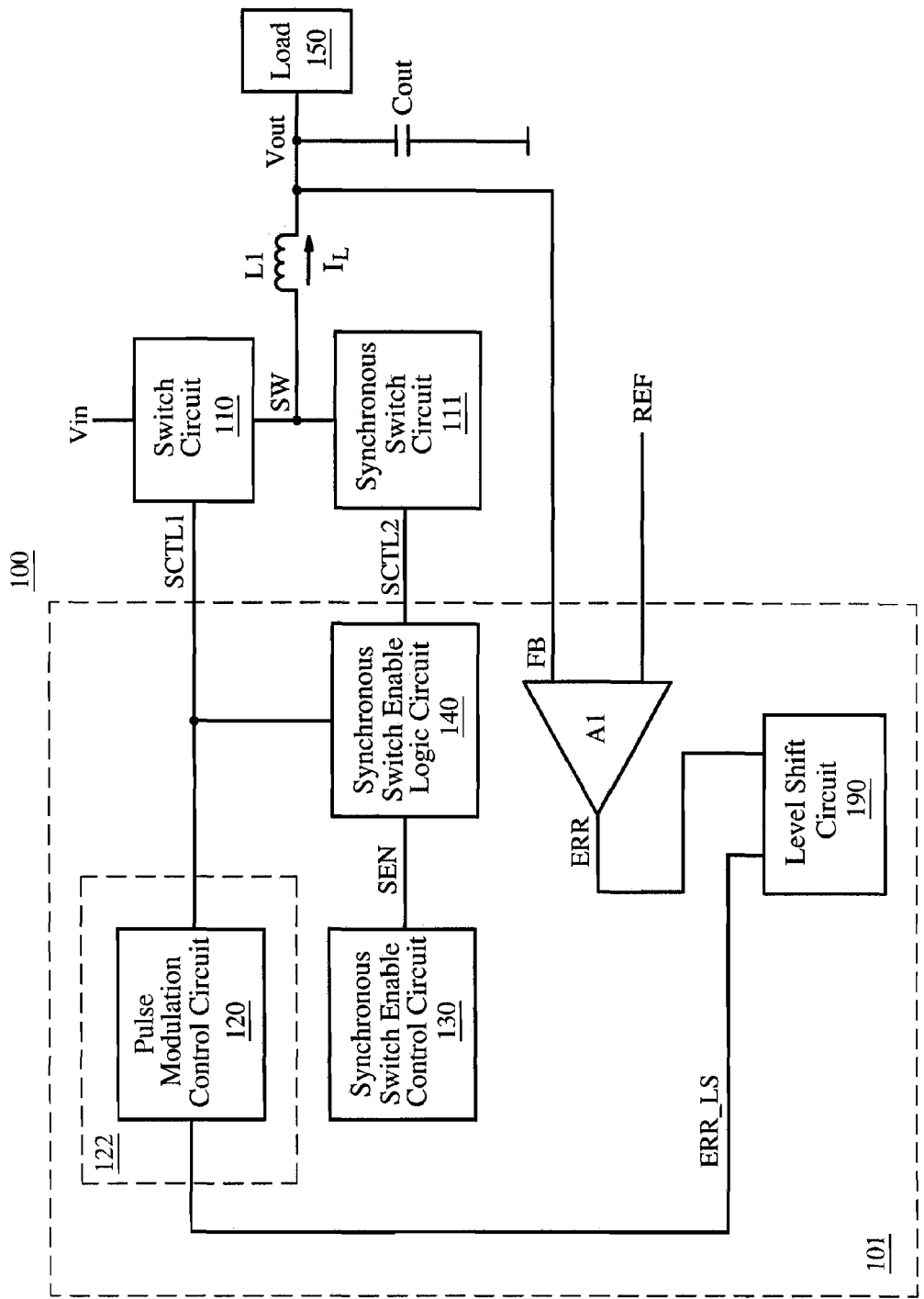
FIG. 1 shows a block diagram of an embodiment of a switching voltage regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a synchronous switching regulator circuit. After the first PWM pulse or at the end of a soft-start, a gradual transition is made from asynchronous rectification to fully synchronous rectification, or vice versa. During the gradual transition, the error voltage is level-shifted down to correct for error caused by reverse current through the body diode of the main switch.

FIG. 1 shows a block diagram of an embodiment of switching regulator circuit 100. Switching voltage regulator circuit 100 may include switch circuit 110, synchronous switch circuit 111, inductor L1, regulator controller 101, output capacitor Cout, and load 150. An embodiment of regulator controller 101 includes pulse modulation control circuit 120, synchronous switch enable control circuit 130, synchronous switch enable logic circuit 140, error amplifier A1, and level shift circuit 190. Additionally, although not shown in FIG. 1, other elements such as a capacitor resistor network may be included between error signal ERR and feedback signal FB to control the frequency response of switching voltage regulator circuit 100.

Switching regulator circuit 100 is arranged to regulate an output signal. In one embodiment, switching regulator circuit 100 is a voltage regulator that is arranged to regulate output voltage Vout. In another embodiment, switching regulator circuit 100 is a current regulator that is arranged to regulate a current that is based, in part, on output voltage Vout.

Switch circuit 110 is arranged to open and close based, in part, on switch control signal SCTL1. Similarly, synchronous switch circuit 111 is arranged to open and close based, in part, on a synchronous switch control signal SCTL2. Inductor L1 is arranged to provide inductor current $I_L$ to output capacitor Cout such that output voltage Vout is provided.

Also, error amplifier A1 is arranged to provide error signal ERR from signals FB and REF. Signal FB is based, at least in part, on output voltage Vout. Additionally, level shift circuit 190 is arranged to provide level-shifted error signal ERR_LS by level-shifting signal ERR based, at least in part, on a reverse current duration that is associated with switch circuit 110. Level shift circuit 190 operates to insert a voltage offset into the feedback loop. However, level shift circuit 190 only performs the level-shifting during certain operation conditions.

Also, pulse modulation control circuit 120 is arranged to provide signal SCTL1 based, in part, on signal ERR_LS. In one embodiment, pulse modulation control circuit 120 includes a pulse width modulation (PWM) circuit. In another embodiment, pulse modulation control circuit 120 includes a pulse frequency modulation (PFM) circuit. In some embodiments, switch control circuit 122 includes only pulse modulation control circuit 120. In other embodiments, switch control circuit 120 also includes other components such as over-voltage protection circuitry and/or the like.

In one embodiment, switching regulator circuit 100 employs a soft-start during a soft-start time interval. The soft-start time interval may begin when switching regulator circuit 100 is enabled.

Synchronous switch enable control circuit 130 is arranged to provide signal SEN such that, during a transition time interval, switching regulator circuit 100 gradually transitions from asynchronous rectification of the output signal (e.g. Vout) to (fully) synchronous rectification of the output signal. This may be accomplished by increasing a modulation parameter of signal SEN. During the transition time interval, switching regulator circuit 100 performs partially synchronous rectification of the output signal. In one embodiment, the duty cycle of signal SEN is gradually increased during the transition time interval. In one embodiment, the transition time interval begins after signal SCTL1 first changes to logic high. In another embodiment, the transition time interval begins when the soft-start time interval ends.

Also, synchronous switch enable logic circuit 140 is arranged to provide signal SCTL2 based, in part, on signals SEN and SCTL1. In one embodiment, synchronous switch enable logic circuit 140 is configured to provide signal SCTL2 such that signal SCTL2 corresponds to a logic high if signal SEN corresponds to an active level and signal SCTL1 corresponds to a logic low, and to provide signal SCTL2 such that signal SCTL2 corresponds to a logic low otherwise.

In one embodiment, when the transition time interval begins, synchronous switch circuit 111 begins to turn on for a minimum time every cycle, and then gradually increases the amount of time it turns on during a switching cycle. In another embodiment, the turn-on time gradually increases from a zero turn-on time, rather than starting with a minimum time.

In one embodiment, a transition from fully synchronous rectification of the output signal to asynchronous rectification may be performed. The transition from fully synchronous rectification to asynchronous rectification may be gradual in substantially the same manner as the transition from asynchronous rectification to fully synchronous rectification previously described. During the gradual transition from fully synchronous rectification to asynchronous rectification, a modulation parameter of the signal SEN is gradually decreased.

While fully synchronous rectification is being performed, inductor current $I_L$ is operating in CCM mode. While asynchronous rectification is being performed, inductor current $I_L$ may be operating in DCM. In this case, the transition from asynchronous rectification to fully synchronous rectification causes a transition of current $I_L$ from DCM to CCM. However, if current $I_L$ does not reach zero during asynchronous rectification, then current $I_L$ is in CCM.

Although FIG. 1 illustrates an arrangement of switching voltage regulator circuit 100 in which switching voltage regulator circuit 100 is a synchronous buck regulator, in other embodiments, switching voltage regulator circuit 100 may be arranged as a synchronous flyback regulator, a synchronous boost regulator, a synchronous buck-boost regulator, or the like. In a synchronous boost regulator arrangement, switch circuit 110 is a bottom-side switch rather than a top-side switch, synchronous switch circuit 111 is a top-side switch rather than a bottom-side switch, and inductor L1 is arranged differently than shown in FIG. 1.

Switching regulator 100 may include more or less components than shown in FIG. 1. For example, some embodiments of switching regulator 100 may include compensation for error amp A1, a voltage reference circuit to provide signal REF, over-voltage protection, over-current protection, and/or the like. In one embodiment, voltage regulator 101 is included on an integrated circuit, and the other components are off-chip. However, in some embodiments, some of the components illustrated in voltage regulator controller 101 may be off-chip, and in other embodiments, some of the component illustrated outside of voltage regulator controller 101 may be on-chip. In one embodiment, the chip may be a voltage regulator and include switch circuit 110 and switch circuit 111 on-chip. In other embodiments, the chip is a regulator controller and switch circuits 110 and 111 may be off-chip. These embodiments and others are within the scope and spirit of the invention.

Figure 2:
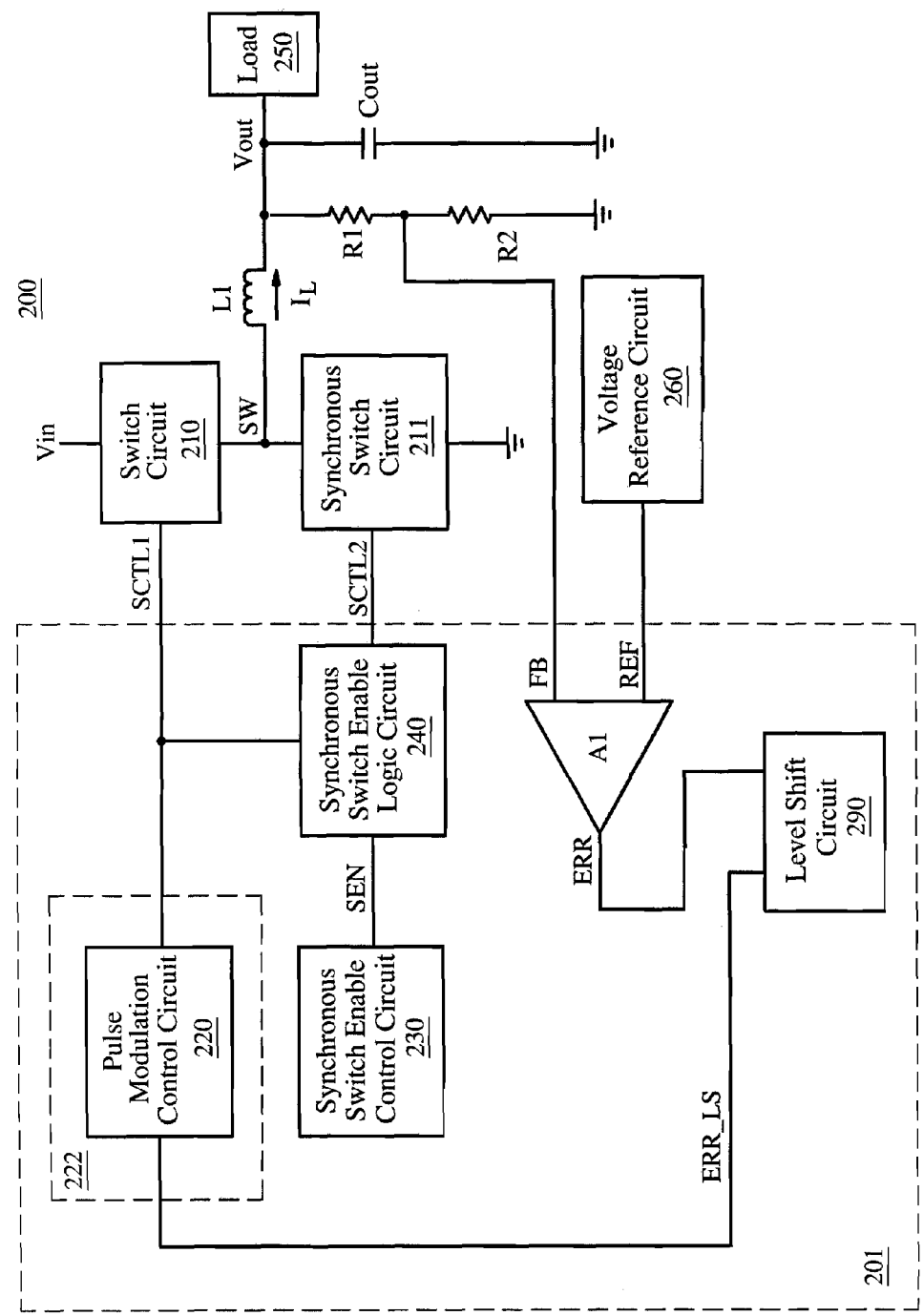
FIG. 2 illustrates a block diagram of an embodiment of the switching voltage regulator circuit of FIG. 1 that includes a voltage divider, an error amplifier, and a voltage reference circuit.

FIG. 2 illustrates a block diagram of an embodiment of switching voltage regulator circuit 200 that includes a voltage divider, an error amplifier, and a voltage reference circuit. Components in switching voltage regulator circuit 200 may operate in a similar manner as similarly-named components in switching regulator circuit 100 of FIG. 1, and may operate in a different manner in some ways. Switching voltage regulator circuit 200 further includes voltage reference circuit 260, and resistors R1 and R2.

Resistors R1 and R2 are arranged as a voltage divider to provide signal FB from output voltage Vout. Additionally, voltage reference circuit 260 is arranged to provide signal REF. In one embodiment, voltage reference 260 is arranged to provide signal REF a relatively constant reference voltage. In another embodiment, voltage reference 260 is arranged to provide signal REF as a soft-start reference. In this embodiment, during the soft-start period, signal REF is arranged to increase signal REF until a reference value is reached. After the soft-start period, signal REF is provided at a relatively constant reference voltage.

Figure 3:
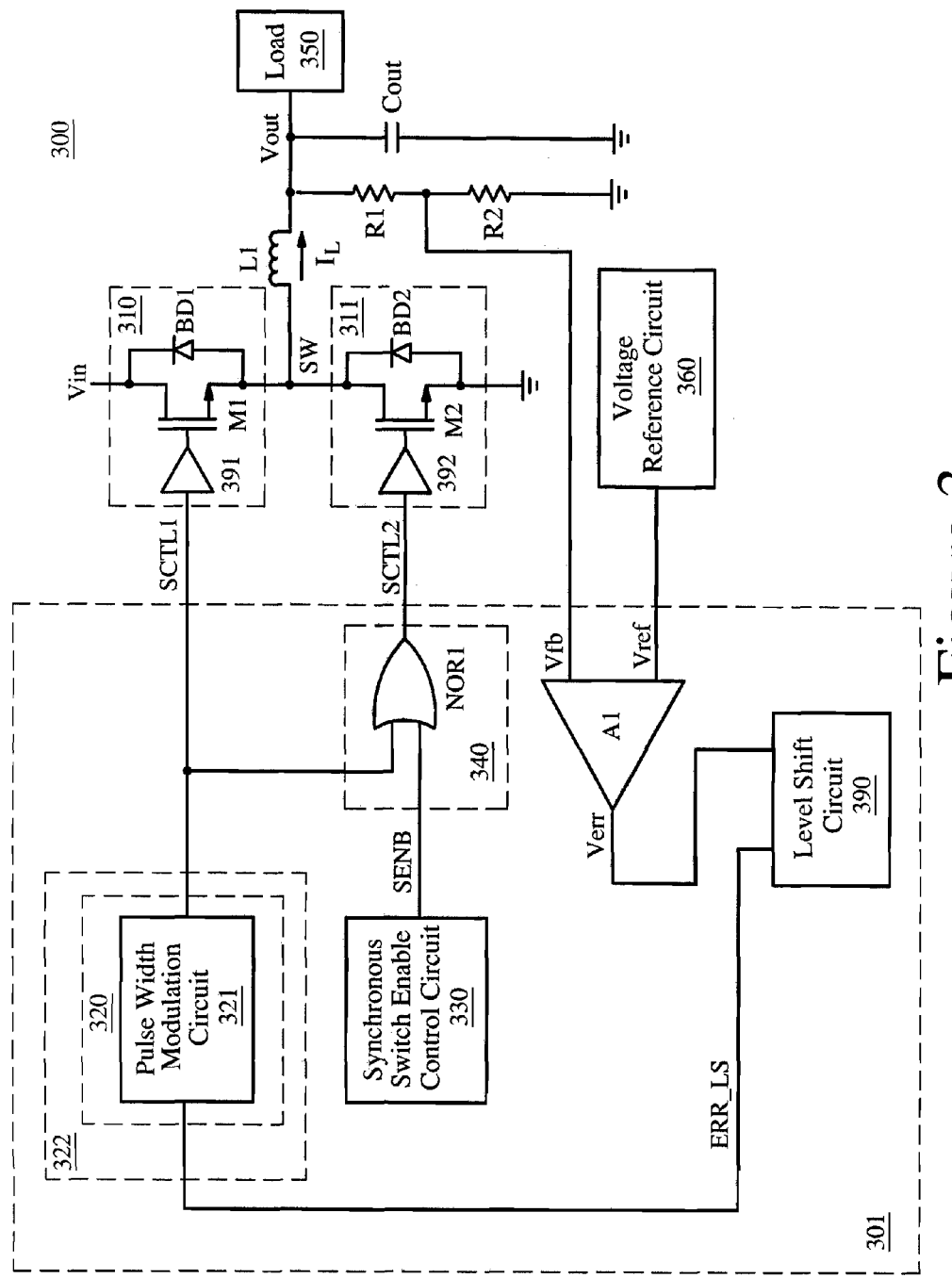
FIG. 3 shows a block diagram of an embodiment of the switching voltage regulator circuit of FIG. 2 in which embodiments of the switch circuit, the synchronous switch circuit, the synchronous switch enable logic circuit, and the pulse modulation control circuit are illustrated.

FIG. 3 shows a block diagram of an embodiment of switching voltage regulator circuit 300, in which embodiments of the switch circuit, the synchronous switch circuit, the synchronous switch enable logic circuit, and the pulse modulation control circuit are illustrated. Components in switching voltage regulator circuit 300 may operate in a similar manner as similarly-named components in switching voltage regulator circuit 200 of FIG. 2, and may operate in a different manner in some ways. Feedback voltage Vfb is an embodiment of feedback signal FB, reference voltage Vref is an embodiment of reference signal REF, and error voltage Verr is an embodiment of error signal ERR.

Switch circuit 310 includes transistor M1 and driver circuit 391. Switch transistor 311 includes transistor M2 and driver circuit 392. Transistor M1 includes a body diode BD1, and transistor M2 includes a body diode BD2. One embodiment of synchronous switch enable logic circuit 340 includes NOR gate NOR1. Also, one embodiment of pulse modulation control circuit 320 includes PWM circuit 321.

In FIG. 3, signal SEN is shown as SENB since it is active low in the embodiment shown. Additionally, in one embodiment NOR gate NOR1 is arranged to provide signal SCTL2 from signals SCTL1 and SENB.

Figure 4:
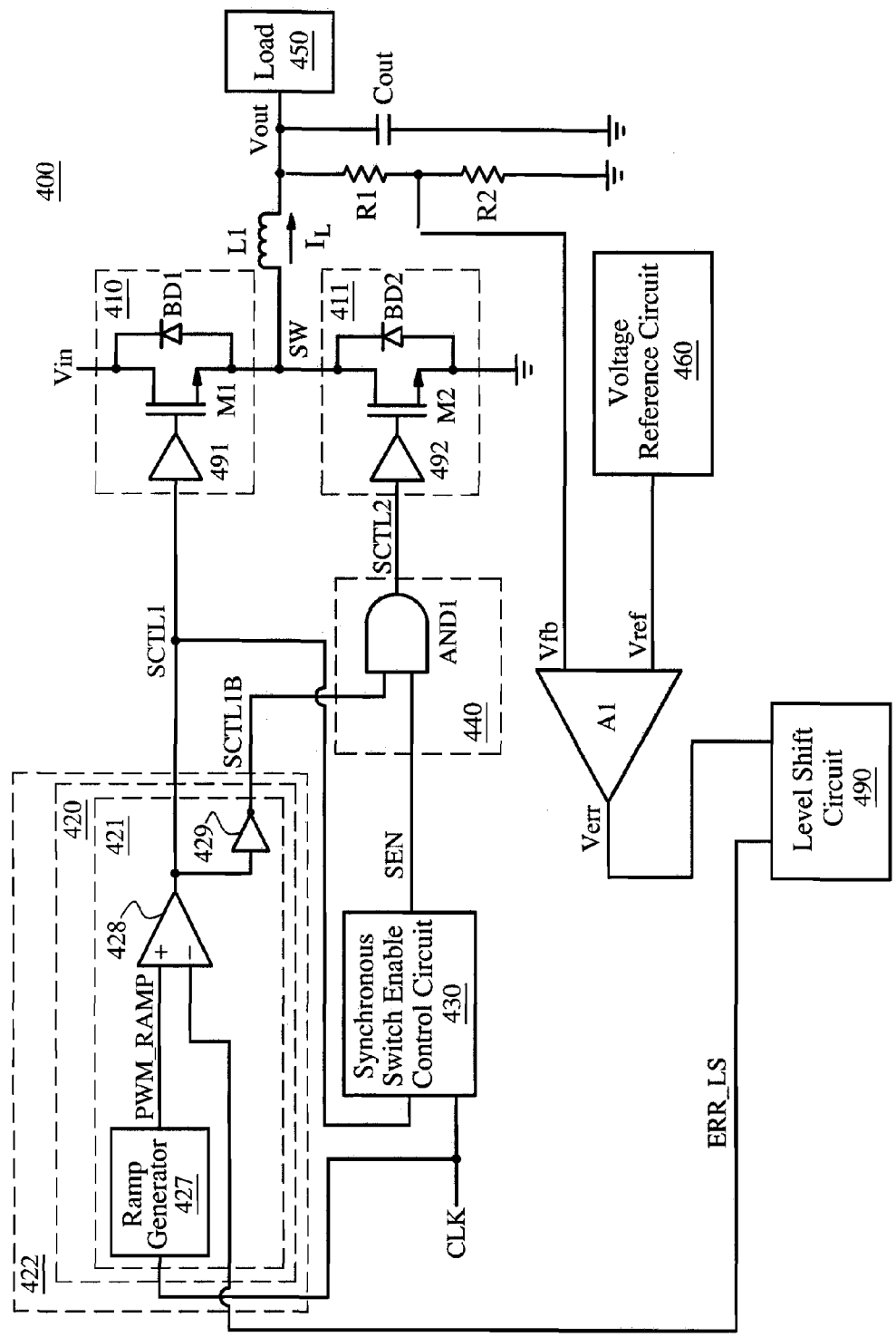
FIG. 4 illustrates a block diagram of an embodiment of the switching regulator circuit of FIG. 2 in which another embodiment of the synchronous switch enable logic circuit is shown.

FIG. 4 illustrates a block diagram of an embodiment of switching voltage regulator circuit 400 in which another embodiment of the synchronous switch enable logic circuit is shown. Components in switching voltage regulator circuit 400 may operate in a similar manner as similarly-named components in switching voltage regulator circuit 300 of FIG. 3 and/or switching voltage regulator circuit 200 of FIG. 2, and may operate in a different manner in some ways. One embodiment of synchronous switch enable logic circuit 440 includes AND gate AND1. In one embodiment, PWM circuit 421 includes ramp generator 427, comparator 428, and inverter 429.

Also, the embodiment of voltage regulator circuit 400 illustrated in FIG. 4, signal SEN is active high. Further, synchronous control enable control circuit 430 is arranged to provide signal SEN based, in part, on signals SCTL1 and signal CLK.

PWM circuit 421 is further arranged to provide signal SCTL1B such that signal SCTL1B is an inverse of signal SCTL1. In one embodiment, AND gate A1 is arranged to provide signal SCTL2 from signals SCTL1B and SEN.

In one embodiment, as shown in FIG. 4, ramp generator 427 is arranged to receive PWM clock signal CLK, and to generate sawtooth signal PWM_RAMP. The frequency of sawtooth signal PWM_RAMP is controlled by signal CLK. Signal PWM_RAMP has a slope sx. In one embodiment, PWM comparator 428 is arranged to compare sawtooth signal PWM_RAMP with signal ERR_LS to provide signal SCTL1. Inverter 429 is arranged to provide signal SCTL1B from signal SCTL1.

Although FIG. 4 shown one embodiment of a pulse width modulator, in other embodiments, the pulse width modulation may be accomplished in other ways.

Pre-biased output startup conditions naturally exist in many systems employing multiple power rails, and can even be present in systems with a single power rail. Typical systems with pre-biased startup conditions include Computer Processing Units (CPUs), CPU chipsets, and FPGAs (Field Programmable Gate Array), all using separate power rails for the core, I/O (input/output) buffers, and auxiliary circuits (for instance, a code multiplexer in CPUs, or analog-to-digital (A/D) converter power). Telecom systems and computers often create pre-biased startup conditions to some of their internal power rails.

A brief list of pre-biased startup scenarios includes: voltage of one rail may sneak to the output of another rail through parasitic p-n junctions of chips; Point-Of-Load (POL) modules could be connected in parallel to supply more power; hot swapping DC-DC modules is a pre-biased startup scenario by definition; a low-power standby voltage regulator (VR) may be connected to a high-power VR via a switchover circuit in notebook computers; in a single-rail power supply power cycling with low-load causes charging the output capacitors, thus creating a pre-biased startup for the next power up cycle.

A non-monotonic power up could be unwanted in the following cases. FPGAs require increasing monotonicity that sometimes includes a "plateau", but a "valley" can disrupt the power up sequencing inside the chip or cause excessive parasitic currents flowing through the FPGA and damaging p-n junctions. Pulling a pre-biasing external power rail down can cause tripping other power rails' Power Good (PGOOD), under-voltage protection (UVP) or over-current protection (OCP) threshold, or resetting large multimodule systems during hot swapping, or burning the leakage path components, or load chip latching up. When current is sunk back from the output rail into the DC/DC buck VR through the low-side FETs during the low duty factor switching occurring during soft start, the VR can begin to act like a boost converter, and in some cases may cause the input voltage to climb, thus damaging the VR parts or the input voltage source.

Some system design aspects that support requirements for a clean pre-biased startup are the following. If pre-biased, synchronous buck regulators may pull VOUT down via turned on low-side FETs. If there is no pre-bias, the non-monotonicity may still be concern because it may causes a glitch in the monotonic output rise during a change from DCM to CCM, thus possibly not complying with the load specs.

In one embodiment, load 450 is a pre-biased load, so that load 450 starts up at a non-zero voltage. When switching voltage regulator circuit 400 is enabled, voltage Vout may be regulated at a pre-biased voltage and transition from the pre-biased voltage Vout to a final regulated voltage for voltage Vout.

In one embodiment in which load 450 is a pre-biased load, switching voltage regulator circuit 400 starts up as follows. Switching voltage regulator circuit 400 starts up in asynchronous rectification such that signal SCTL2 corresponds to logic zero. A soft-start is employed such that voltage Vout gradually increases from the pre-biased voltage during asynchronous rectification. When the start-soft ends, the transition time interval begins, in which signal Vout is partially synchronously rectified. After the transition time interval, switching voltage regulator circuit 400 begins normal operation, in which (fully) synchronous rectification is performed.

Preferably, if load 450 is a pre-biased load, the transition to synchronous rectification starts after the voltage starts increasing from the initial pre-biased value. The transition time interval may start at virtually any time after the voltage start increasing from the initial pre-biased value. As described above, in one embodiment, the transition time interval begins at the end of soft-start. The transition from asynchronous rectification of signal Vout to synchronous rectification of signal Vout is performed relatively slowly, (preferably with soft-start type time constants) so that error amplifier A1 can respond seamlessly to the change from asynchronous rectification to synchronous rectification. In one embodiment, the relatively slow transition may be implemented by slowly increasing the width of high pulses in signal SCTL2. After the transition time interval is completed, current $I_L$ is operating in CCM.

For any given duty cycle of signal SCTL1, voltage gain Vout/Vin may be different for DCM than it is for CCM. Also, for any given duty cycle, the voltage gain may be different for asynchronous rectification than is for synchronous rectification, even if the inductor current is in CCM for both the asynchronous and synchronous rectification. By employing a gradual transition from asynchronous rectification to synchronous rectification, a voltage glitch or transient response may be prevented. The transition from asynchronous rectification to synchronous rectification is preferably performed in a sufficiently gradual manner that the closed loop control can compensate for the difference between voltage gain in asynchronous rectification and voltage gain in synchronous rectification.

The circuit of FIG. 4 enables a monotonic start-up into a pre-biased load for a synchronous switching regulator.

FIGS. 5A-5D show timing diagrams of waveforms of embodiments of signal SCTL1, signal SCTL2, signal SW, and current $I_L$, respectively, for an embodiment of the circuit of FIG. 4.

For the embodiment illustrated in FIG. 55D, inductor current $I_L$ operates in DCM during asynchronous rectification, and operates in CCM during fully synchronous rectification. During the gradual transition from asynchronous rectification to synchronous rectification, current $I_L$ gradually transitions from DCM to CCM. This mode of operation between DCM to CCM is a new operating mode named Transition Conduction Mode (TCM) by the inventors. TCM is a new operating mode with distinct gain characteristics. The inductor current is either continuous or discontinuous; however, TCM has the unique possibility of discontinuous conduction with negative current and continuous conduction controlled by the synchronous switch.

As shown in FIG. 5D, current $I_L$ ramps upward when switch circuit 410 turns on. In the embodiment shown in FIG. 5A, this occurs in response to a pulse in signal SCTL1. Current $I_L$ then ramps downward when switch circuit 410 turns off. Current $I_L$ does not go below zero unless synchronous switch circuit 411 is turned on, where synchronous switch circuit 411 is turned on if signal SCTL2 is high. If signal SCTL2 changes from high to low and current $I_L$ is below zero, current $I_L$ ramp upwards until it reaches zero.

As shown by in FIGS. 5B and 5D, the pulse width of signal SCTL2 is gradually increased during the transition to fully synchronous rectification, until fully synchronous rectification is reached.

In one embodiment, due to the gradual increase in pulse width during TCM, for each period of the inductor current, the pulse width of signal SEN is gradually increased during each successive clock period. The duty cycle increases between a first period of current $I_L$ and the period that occurs after the first period of current $I_L$, and increases further still on the period of current $I_L$ after that. FIG. 5 shows an increase that occurs over a small number of clock cycles for illustrative purposes. However, preferably, as discussed above, the increase in pulse width of signal SCTL2 is sufficiently gradual that the closed loop control can compensate for the difference between voltage gain in DCM and voltage gain in CCM. The gradual increase may occur over on the order of 1000 periods of current $I_L$.

After FET M2 is turned off and inductor current $I_L$ is negative, inductor current $I_L$ ramps back to zero. As FET M2 has already turned off, the only path for inductor current $I_L$ to ramp back to zero is via body diode BD1.

This period where inductor current $I_L$ ramps up (and the SW node is boosted to Vin+Vd, where Vd is the forward voltage of body diode BD1) is essentially a period where energy is being put into output capacitor Cout but in an uncontrolled way; the control loop does not command this upslope. The control loop only commands the upslope during the period when SCTL1 is turned on. Because of this extra period, if no level-shifting is performed, the output of error amplifier A1 effectively now only needs to command a lower SCTL1 on pulse as there is an extra (uncontrolled) period where energy is being put into output capacitor Cout.

At the end of the sequencing of slowly increasing the FET M2 on-pulse, this extra period in which inductor current $I_L$ ramps to zero via body diode BD1 eventually disappears (because the timing is such that the valley of inductor current $I_L$ will eventually coincide with the SCTL1 turn on pulse). If level-shifting is not performed to compensate, the control loop requests the SCTL1 on pulse to be equal to what it was before plus the extra period where inductor current $I_L$ ramps to zero via body diode BD1, which would cause a sudden transition of Verr to compensate for the extra turn-on time needed, and could cause the output voltage Vout to dip.

To prevent this from causing a dip on the output voltage Vout, error voltage Verr is level-shifted by level-shifter 490 such that the voltage regulator loop commands the correct steady state M1 FET on time. During the sequencing of FET M2 on pulse gradually turning on, a level shifted (down) version of the output of the error amplifier output, ERR_LS is used so that FET M1 on-time is less the period when inductor current $I_L$ ramps up via body diode BD1. This level-shifting process gradually diminishes as the sequencing period comes to an end.

As stated above, TCM is a new operating mode for a DC-DC converter that may act as a bridge between DCM and CCM, and is an operating mode with gain characteristics that are distinct from DCM and CCM. The inventors have determined that the gain (Vout/Vin) for a buck regulator operating in TCM may be approximately given by:

$$\text{Gain}_{TCM} = \frac{V_{OUT}}{V_{in}} = \frac{1}{2} + \frac{D_{HS}^2}{2 \cdot K_{load}} \cdot \left(1 + \frac{2 \cdot D_{HS}}{D_{LS}}\right) - \frac{D_{HS}}{K_{load}} \cdot \sqrt{K_{load} + \left(\frac{D_{HS}}{2} - \frac{K_{load}}{2 \cdot D_{LS}}\right)^2}$$

where $D_{HS}$ represents the duty cycle of the high-side switch, $D_{LS}$ represents the duty cycle of the low-side switch, $K_{load}$ represents the parameterized load constant, given by:

$$K_{load} = 2 \cdot \frac{L1 \cdot f_{sw}}{R},$$

$f_{sw}$ represents is the switching frequency of the PWM modulator, and where R represents the resistance of the load.

Figure 6:
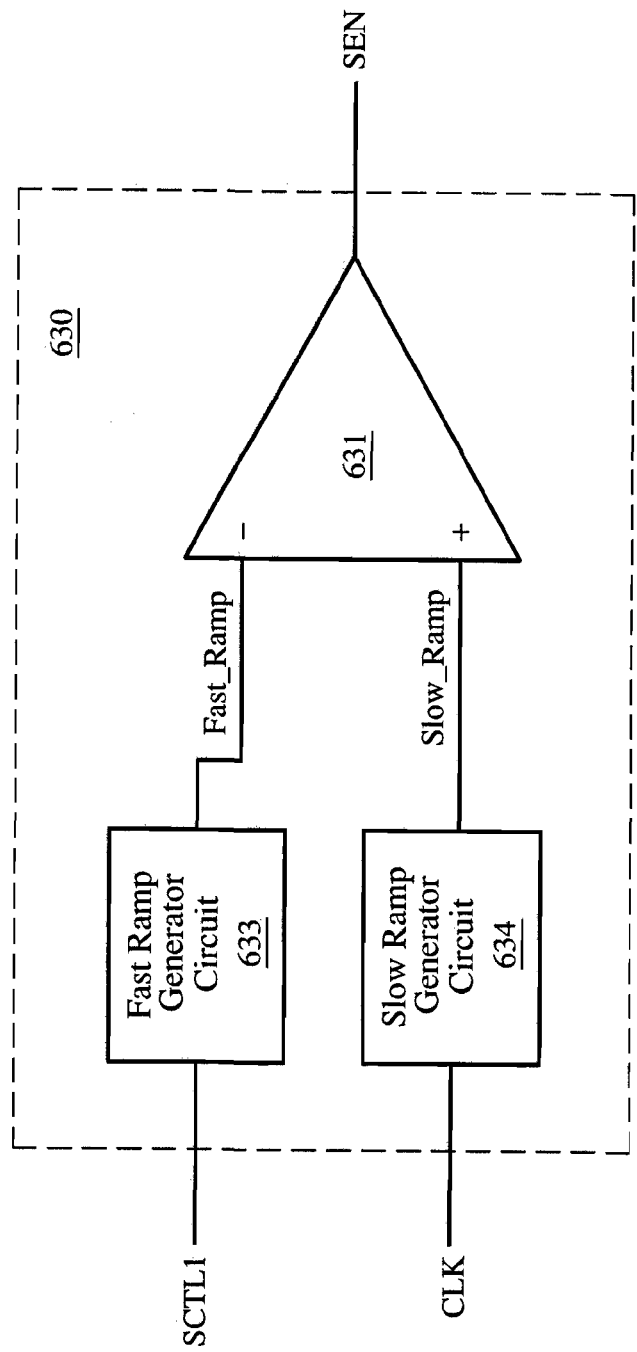
FIG. 6 illustrates a block diagram of an embodiment of the synchronous switch control enable circuit of FIG. 4.

FIG. 6 illustrates a block diagram of an embodiment of synchronous switch control enable circuit 630. Synchronous switch control enable circuit 630 may operate in a substantially similar manner as described for synchronous switch control enable circuit 430 of FIG. 4, and may operate in a different manner in some ways. Synchronous switch control enable circuit 630 includes comparator circuit 631, fast ramp generator circuit 633, and slow ramp generator circuit 634.

Slow ramp generator circuit 634 is arranged to provide ramp signal Slow_Ramp. Fast ramp generator circuit 633 is arranged to provide signal Fast_Ramp signal such that signal Fast_Ramp resets if the first switch control signal corresponds to a low logic level. Also, fast ramp generator circuit 633 is arranged to provide signal Fast_Ramp such that signal Fast_Ramp ramps upwards at a rate that is significantly faster than a rate at which signal Slow_Ramp ramps upward if the first control signal corresponds to a high logic level.

Figure 7:
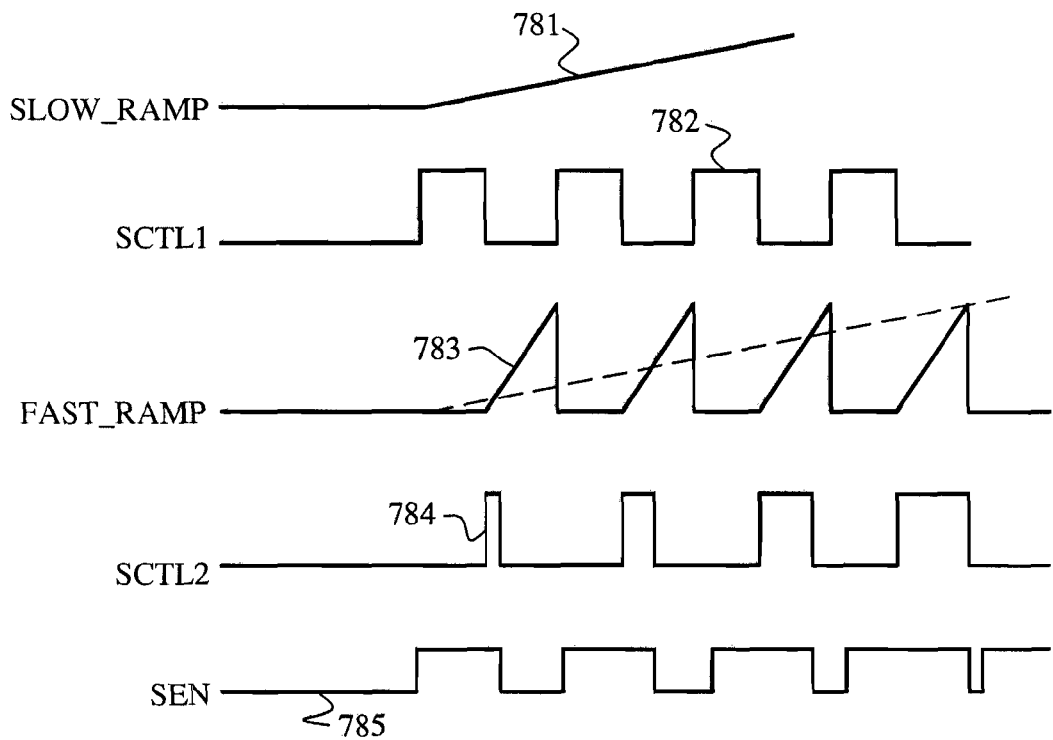
FIG. 7 shows a timing diagram of waveforms of embodiments of signals Slow_Ramp and Fast_Ramp of FIG. 6, and signals SCLT1 and SCTL2 of FIG. 4.

FIG. 7 shows a timing diagram of waveforms of embodiments of signals 781, 783, 782, 783, 784, and 785 of Slow_Ramp and Fast_Ramp, of FIG. 6, signals SCLT1 and SCTL2 of FIG. 4, and signal SEN of FIG. 6, respectively.

Signal Slow_Ramp may increase at much slower rate of speed than is shown for illustrative purposes in FIG. 7. This way, the gradual transition into fully synchronous rectification may occur over a large number of clock cycles so that that the closed loop control can compensate for the difference between voltage gain in asynchronous rectification and the voltage gain in fully synchronous rectification, as explained above.

Figure 8:
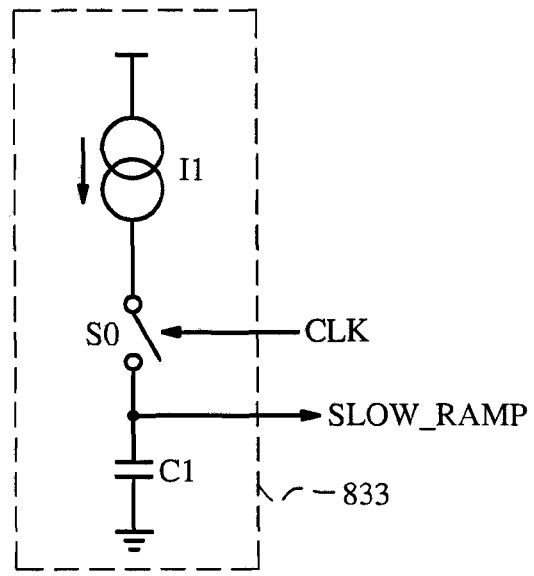
FIG. 8 schematically illustrates an embodiment of the slow ramp generator circuit of FIG. 6.

FIG. 8 schematically illustrates an embodiment of slow ramp generator circuit 833. Slow ramp generator circuit 833 may operate in a substantially similar manner as described for slow ramp generator circuit 633 of FIG. 6, and may operate in a different manner in some ways. Slow ramp generator circuit 833 includes current source I1, capacitor C1, and switch S0. Switch S0 is arranged to open and close responsive to signal CLK.

Figure 9:
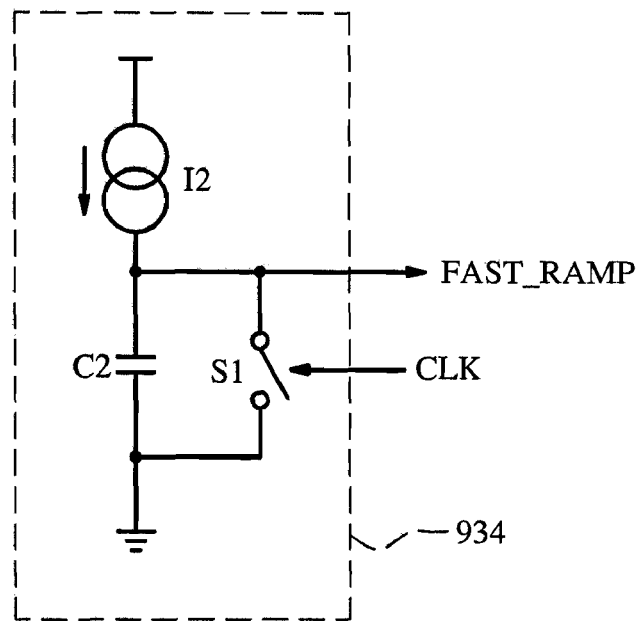
FIG. 9 schematically illustrates an embodiment of the fast ramp generator circuit of FIG. 6.

FIG. 9 schematically illustrates an embodiment of fast ramp generator circuit 934. Fast ramp generator circuit 934 may operate in a substantially similar manner as described for fast ramp generator circuit 634 of FIG. 6, and may operate in a different manner in some ways. Fast ramp generator circuit 934 includes current source I2, capacitor C2, and switch S1. Switch S1 is arranged to open and close responsive to signal SCTL1.

Figure 10:
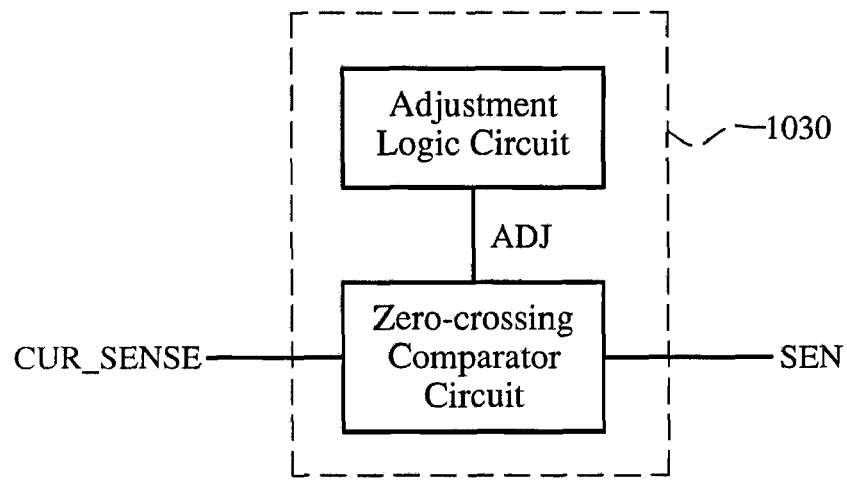
FIG. 10 shows a block diagram of another embodiment of the synchronous switch control enable circuit of FIG. 4.

FIG. 10 shows a block diagram of an embodiment of synchronous switch control enable circuit 1030. Synchronous switch control enable circuit 1030 may operate in a substantially similar manner as described for synchronous switch control enable circuit 130 of FIG. 1, and may operate in a different manner in some ways. Synchronous switch control enable circuit 1030 includes zero-crossing comparator circuit 1035 and adjustment logic circuit 1036.

Zero-crossing comparator circuit 1036 may be arranged to provide signal SEN from current sense signal Cur_sense. Signal Cur_sense may be substantially proportional to current $I_L$ (e.g. of FIG. 1). Adjustment logic circuit 1036 may be arranged to provide signal ADJ. Also, zero-crossing comparator circuit 1035 may be arranged such that an offset and/or a threshold of zero-crossing comparator circuit 1035 is adjustable responsive to signal ADJ. Further, adjustment logic circuit 1036 may be arranged to provide signal ADJ such that a pulse width of signal SEN is gradually increased during the transition from asynchronous rectification to fully synchronous rectification.

In this embodiment, the gradual transition to fully synchronous rectification is accomplished by slowly lowering the sensed valley point of the inductor current. This way, the valley of the inductor current is gradually decreased from zero down to its steady-state value.

Figure 11:
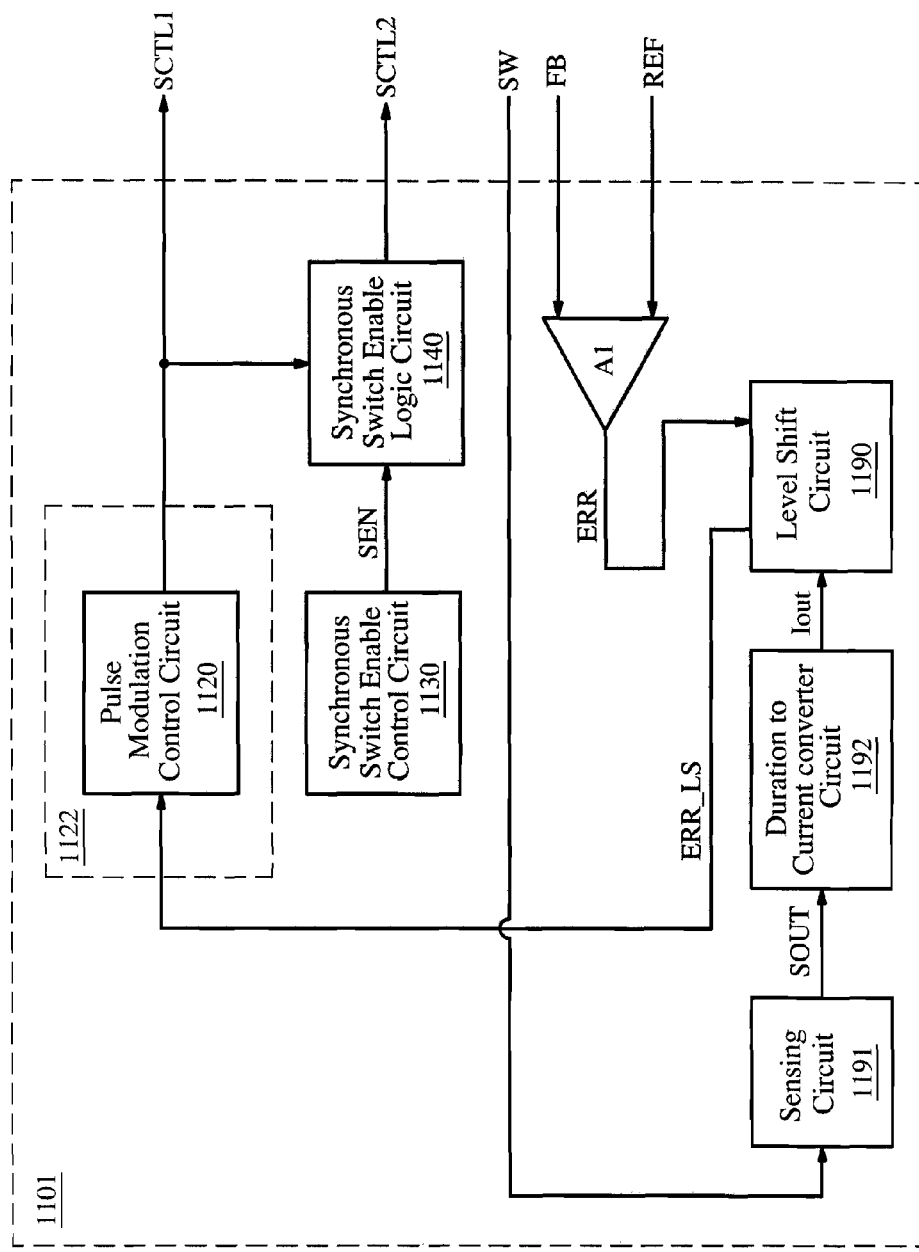
FIG. 11 illustrates a block diagram of an embodiment of the regulator controller of FIG. 1.

FIG. 11 illustrates a block diagram of an embodiment of the regulator controller 1101, which may be employed as an embodiment of regulator controller 101 of FIG. 1. Regulator controller 1101 further includes sensing circuit 1191 and duration-to-current converter 1192.

In operation, sensing circuit 1191 senses a reverse current duration (Tb), and provides sensing circuit output signal SOUT based on the sensed current duration. In one embodiment, signal SOUT is asserted when reverse current is flowing through diode BD1, and unasserted otherwise. The time for which signal SOUT is asserted is the reverse current duration, Tb. Further, signal SOUT is provided as follows in one embodiment. If inductor current $I_L$ is less than zero while the synchronous switch (e.g. synchronous switch circuit 111 of FIG. 1) is on, then signal SOUT is asserted at the next rising pulse of signal SW, and de-asserted at the next falling pulse of signal SW that proceeds the rising pulse of signal SW. (FIGS. 12A-D, discussed below, explain this embodiment in greater detail). This way, signal SOUT is asserted when the main switch (e.g. switch circuit 110) is conducting reverse current through its body diode, and unasserted otherwise.

Additionally, duration-to-current converter circuit 1192 is arranged to provide current Iout such that current Iout is proportional to the on-time of signal SOUT. Also, level shift circuit 1190 is arranged to level-shift voltage ERR_LS such that signal ERR_LS is level-shifted downward, where the level shift ΔV is proportional to current Iout.

The reverse current correction is put in place in parallel with the voltage control loop of the switching regulator. Accordingly, the correction that the circuit provides is done in a feed-forward way. If the level-shift circuit were not present, then the voltage control loop would correct the transition and thus the correction will be done at the speed equal to the voltage control loop bandwidth. However with the level-shift circuit included, in one embodiment, the correction will be done with a delay of 1 switching cycle (as the sensing block measures the duration Tb from the previous cycle and applies the correction to the present cycle). Accordingly, an embodiment of regulator controller 1191 may act relatively fast and avoids the potential discontinuity.

FIGS. 12A-12D show timing diagrams of waveforms of embodiments of signals for an embodiment of regulator controller 1101 of FIG. 11. FIGS. 12A-D help illustrate how the reverse current duration is detected in one embodiment. As shown, when signal SCTL2 is on (turning transistor M2 on) and inductor current $I_L$ is negative, this means that the next pulse of signal SW corresponds to the period when $I_L$ ramps up via reverse current through body diode BD1.

FIGS. 13A-13D illustrate timing diagrams of waveforms of embodiments of signals for an embodiment of regulator controller 1101 of FIG. 11. As shown, signal SW tends to ring after inductor current $I_L$ reaches zero. For this reason, in one embodiment of sensing circuit 1191, SOUT is de-asserted on the falling edge of SW, so that only the first pulse is used and the ringing is not detected.

Accordingly, in one embodiment, sensing block 1191 provides signal SOUT as follows:

1. When SCTL2 is asserted and inductor current is negative, a signal is latched to indicate that next SW pulse should be passed into the ΔT-to-current converter.

2. Upon the falling edge of signal SW node after the desired duration for measurement, the latch is reset to block all the ringing from being detected.

3. The latch is also reset with the PWM clock (SET) pulse coming from the switching regulator.

Figure 14:
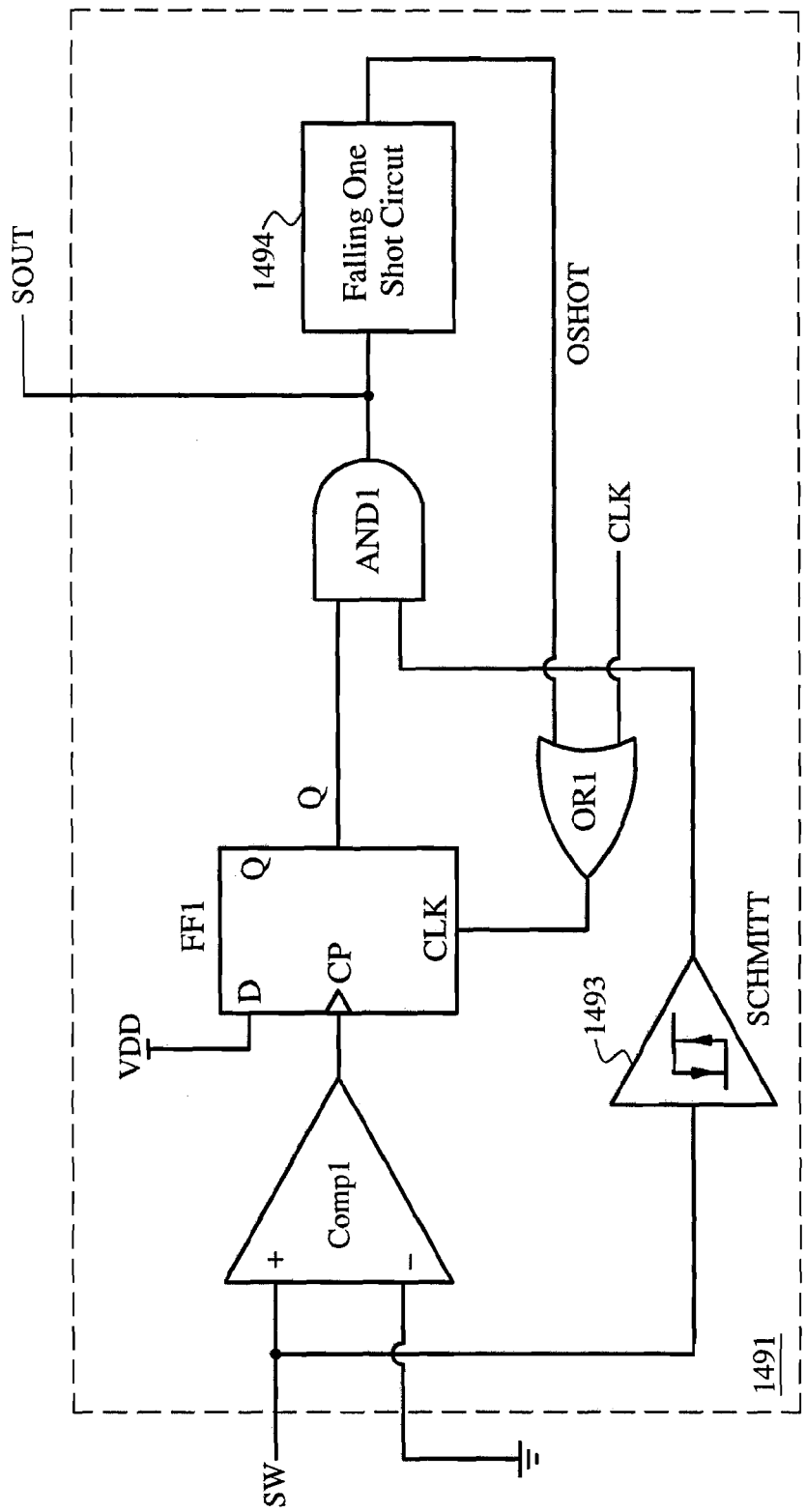
FIG. 14 shows a block diagram of an embodiment of the sensing circuit of FIG. 11.

FIG. 14 shows a block diagram of an embodiment of sensing circuit 1491, which may be employed as an embodiment of sensing circuit 1191 of FIG. 11. Sensing circuit 1491 includes comparator Comp1, Schmitt trigger 1493, flip flop FF1, AND gate AND1, OR gate OR1, and falling one-shot circuit 1494. Falling one shot circuit 1492 is arranged to provide one shot signal Oshot responsive to signal SOUT. OR gate OR1 receives signal OSHOT and signal CLK, where signal CLK is the clock used by the pulse width modulation circuit (e.g. pulse width modulation circuit 321 of FIG. 3).

Figure 15:
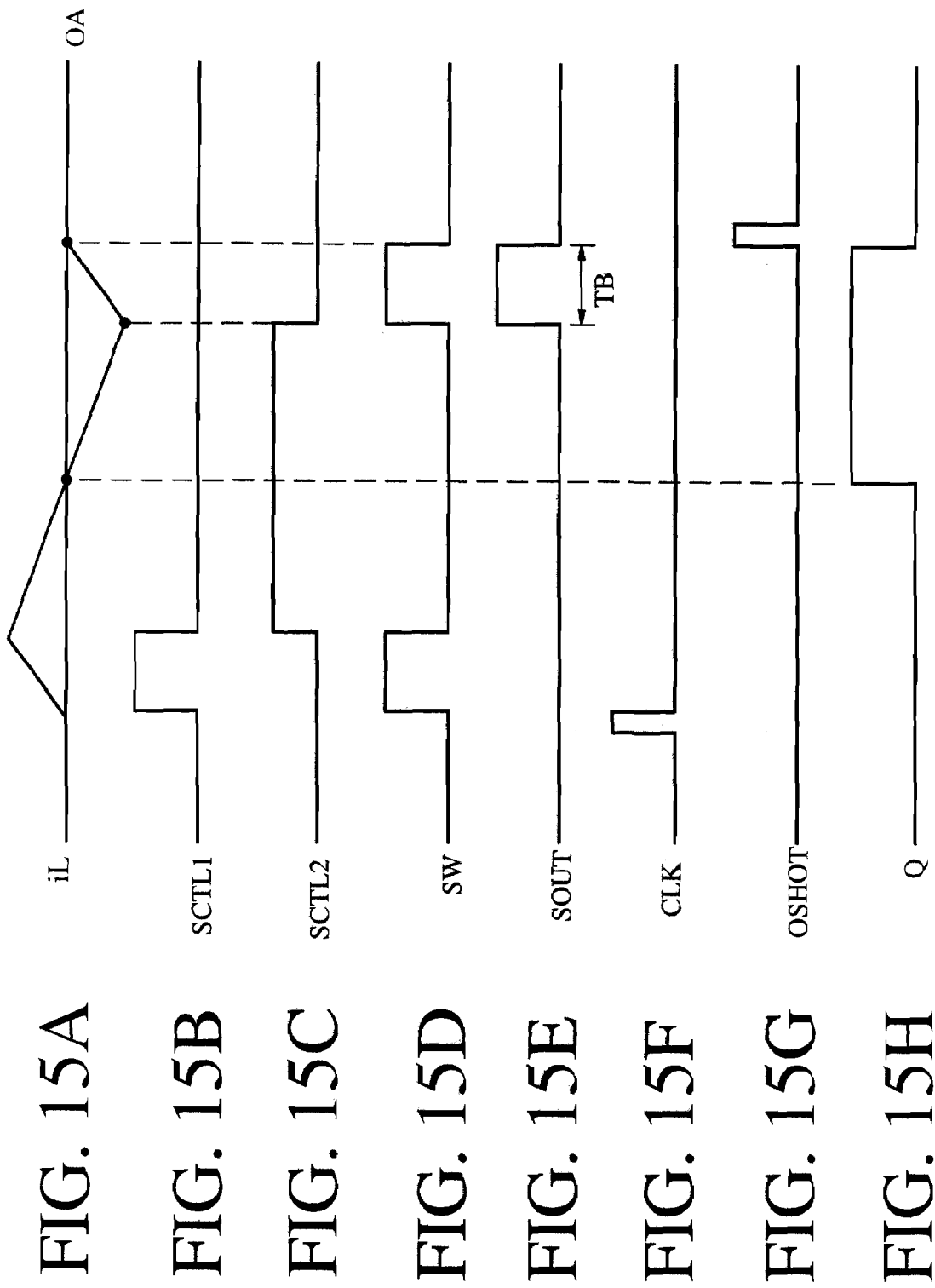
FIGS. 15 A-H illustrate timing diagrams of waveforms of embodiments of signals for an embodiment of the sensing circuit of FIG. 14.

FIGS. 15 A-H illustrate timing diagrams of waveforms of embodiments of signals $I_L$, SCTL1, SCTL2, SW, SOUT, CLK, OSHOT, and Q, respectively, for an embodiment of sensing circuit 1491 of FIG. 14.

Figure 16:
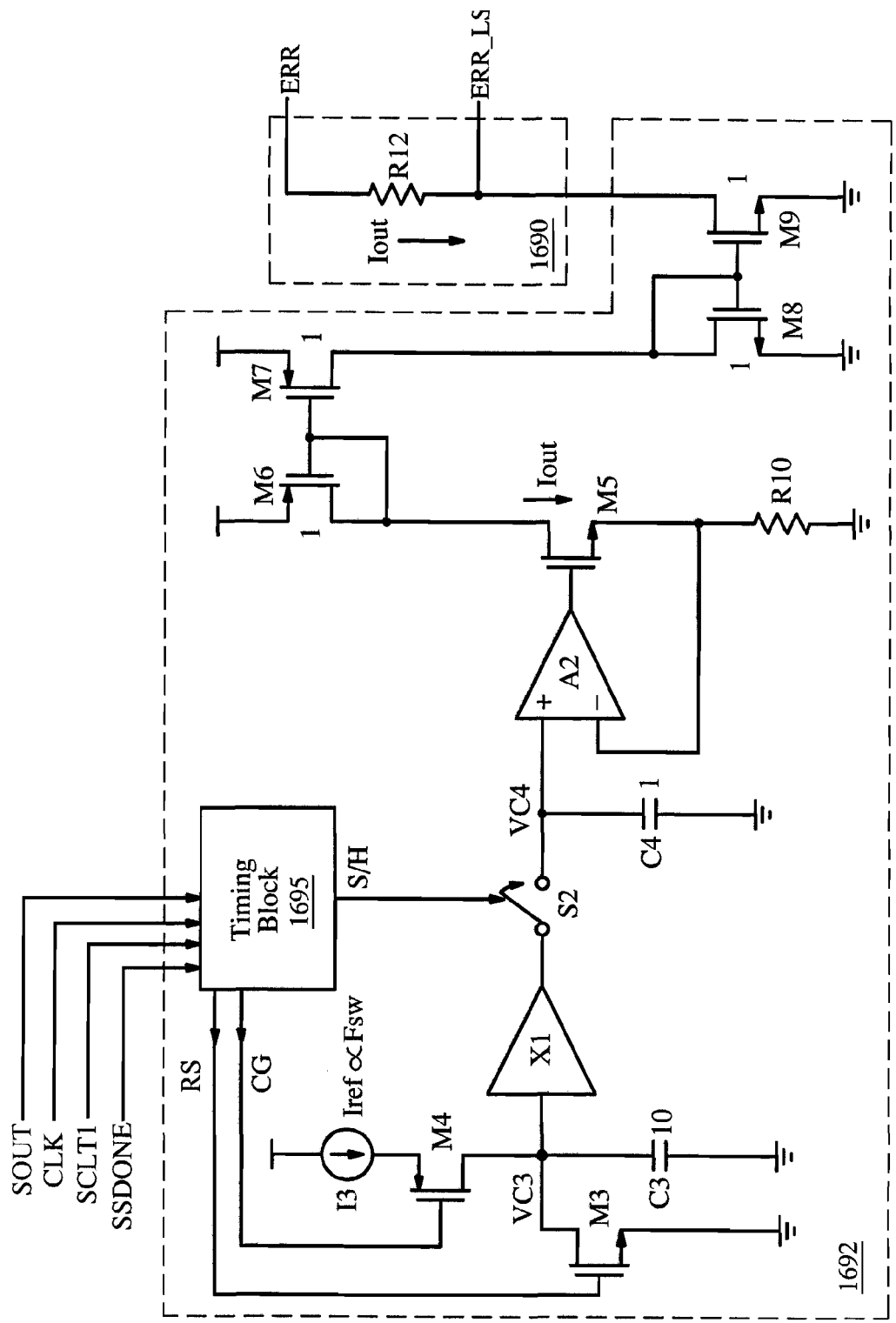
FIG. 16 shows a block diagram of an embodiment of the duration-to-current converter and of the level-shift circuit of an embodiment of the circuit of FIG. 11.

FIG. 16 shows a block diagram of an embodiment of duration-to-current converter 1692 and of level-shift circuit 1690, which may be employed as embodiments of duration-to-current converter 1192 and level-shift circuit 1190 of FIG. 11 respectively of FIG. 11. Duration-to-current converter 1692 includes timing block 1695, transistors M3-M9, current source I3, capacitors C3 and C4, buffer X1, op amp A2, and resistor R10.

Timing block 1695 is arranged to receive signals SOUT, CLK, SCTL1, and SSDONE; and to provide signals RS, CG, and S/H. Signal SSDONE is asserted when soft start of reference signal REF is complete. Further, signal CG is used to control transistor M4, which operates as a switch that is closed to charge transistor C3, and opened to stop charging capacitor C3. Capacitor C3 is charged by current source I3, which provides current Iref. In one embodiment, current Iref is proportional to the switching frequency $f_{sw}$ (which is the frequency of signal CLK). Signal RS is used to discharge capacitor C3. Also, sample-and-hold signal S/H is used to control switch S2 for sampling and holding voltage VC3 onto capacitor C4. In some embodiments, after a pulse occurs in signal SOUT, signal S/H is asserted on the next pulse of signal CLK. This is done because the level-shifting based on SOUT is done at the beginning of the next cycle. In other embodiments this may be done any time from the time that the CLK pulse start until the next time SCTL1 is asserted.

In one embodiment, timing block 1985 is used to control the timing for sampling and holding the peak value of capacitor C3 onto C4, according to the following sequence of events:

1) If a rising edge occurs in signal SOUT while signal SSDONE is asserted, timing block 1695 asserts signal CG to start charging capacitor C3 to charge, beginning the process.

2) Next, when a falling edge occurs in signal SOUT, signal CG is de-asserted to stop capacitor C1 from charging (but does not discharge it).

3) Signal CLK is used as a period when VC3 gets sampled onto C4.

4) A one-shot (not shown) in timing block 1695 detects the falling edge of signal CLK then asserts signal RS to discharge capacitor C3, getting it ready for the next cycle.

Op amp A2, transistor M5, and resistor R10 operate to provide current Iout so that current Iout is approximately equal to voltage VC4/R10. Also, current mirrors M6/M7 and M8/M9 are arranged to mirror current Iout to resistor R12. Resistor R12 is arranged to provide signal ERR_LS such that ERR_LS=ERR−R12*Iout.

In one embodiment, the capacitance of capacitor C3 to C4 is 10:1. However, in other embodiments, other ratios may be used. Virtually any type of capacitor may be used for capacitors C3 and C4 within the scope and spirit of the invention. However, in a preferred embodiment, capacitors C3 and C4 are linear capacitors (such as poly-poly capacitors).

Figure 17:
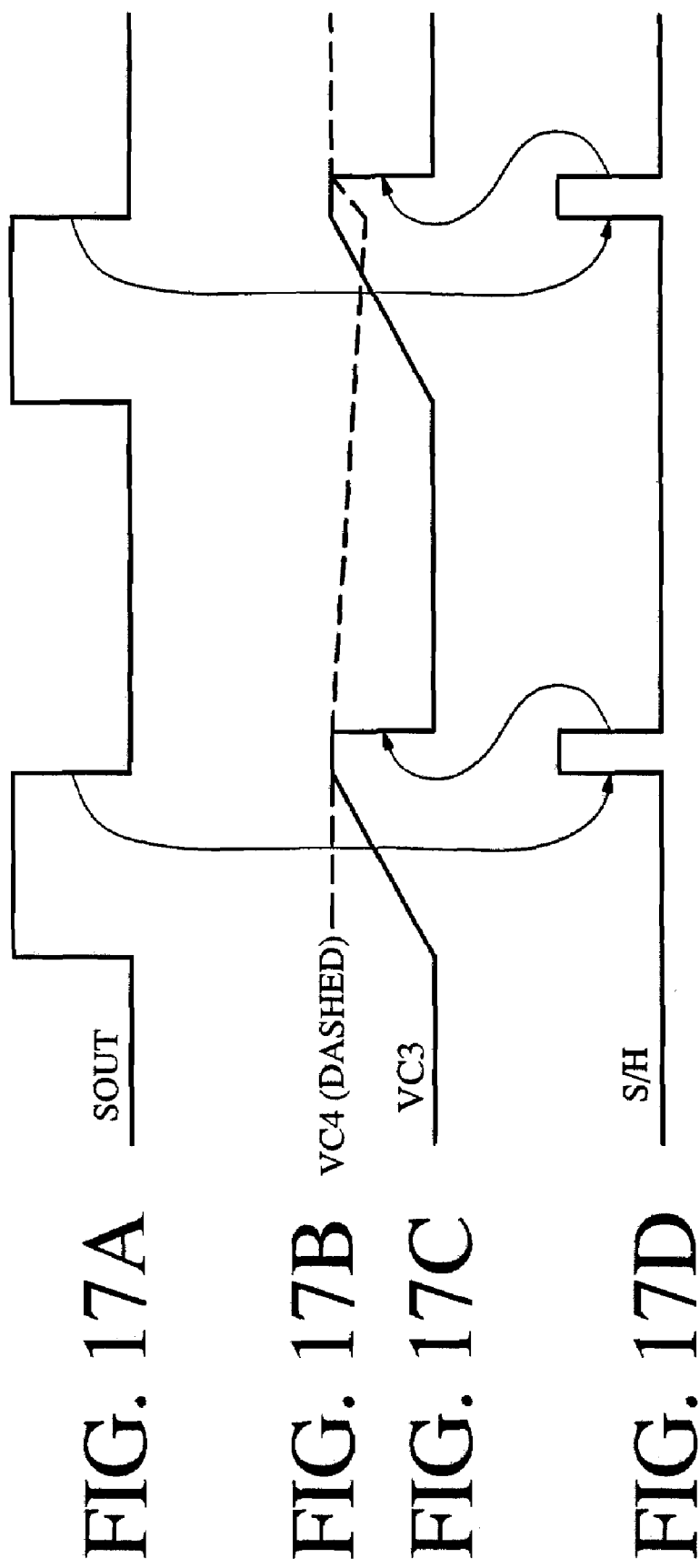
FIGS. 17 A-D illustrate timing diagrams of waveforms of embodiments of signals for an embodiment of the circuit of FIG. 16.
Figure 18:
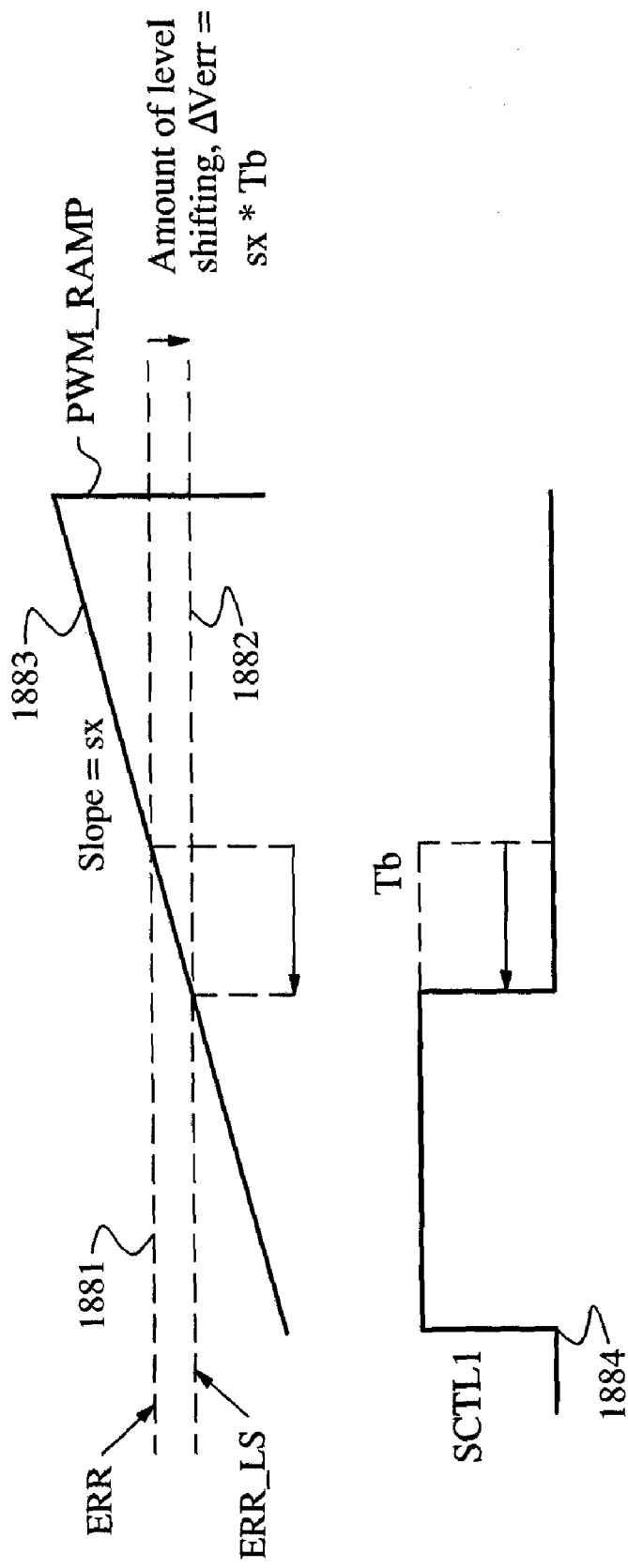
FIG. 18 shows timing diagrams of waveforms of embodiments of signals for an embodiment of the circuit of FIG. 11, arranged in accordance with aspects of the invention.

FIGS. 17 A-D illustrate timing diagrams of waveforms of embodiments of signals SOUT, VC4, VC3, AND S/H, respectively, for an embodiment of current-to-duration converter circuit 1692 of FIG. 16. FIG. 18 shows timing diagrams of waveforms 1881-1884 of embodiments of signals ERR, ERR_LS, PWM_RAMP, and SCTL1, respectively, for an embodiment of regulator controller 1101 of FIG. 11.

In one embodiment, parameters of various components in duration-to-current converter circuit 1692 and level-shift circuit 1690 are selected by the designer so that the proportionality of the duration of signal SOUT to the level shift ΔVerr=ERR−ERR_LS correctly compensates for the extra pulse in SW caused by the reverse current. As illustrated in FIG. 18, in this embodiment, the amount of level-shifting ΔVerr=sx*Tb, where Tb is the duration for which body diode BD1 conducts reverse current, sx is the slope of signal PWM_RAMP (e.g. of FIG. 4).

In this embodiment, the amount of level shifting is accomplished by the amount:

$$\Delta Verr = Iout * R12.$$

Where Iout=VC4/R10, and VC4=VC3=Tb*(Iref/C3).

Accordingly, in a preferred embodiment the designer preselects parameters so that the following equations are satisfied:

$$sx*Tb = Tb*(Iref/C3)*(R12/R10)$$

$$sx = (Iref/C3)*(R12/R10).$$

It should be emphasized that although all of the switching regulators illustrated herein have all been buck regulators, other topologies are within the scope and spirit of the invention, including but not limited to boost regulators, buck-boost regulators, inverting regulators, and/or the like. Also, although a particular type of control loop has been shown herein, other control loops may be used. For example, in addition to voltage mode control as shown, other embodiments may use current mode control and/or the like. These embodiments and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for switching regulation, comprising:
an error amplifier that is arranged to provide an error signal based, in part, on an output signal;
a switch control circuit including a pulse modulation control circuit, wherein the switch control circuit that is arranged to provide a first switch control signal based on a pulse modulation control circuit input signal, wherein the first switch control signal controls opening and closing of a first switch circuit, and wherein the pulse modulation control circuit input signal is based, in part, on the error signal;
a synchronous switch enable control circuit that is arranged to provide a synchronous switch enable signal such that, during a transition time interval, a modulation parameter of the synchronous switch enable signal is gradually increased or gradually decreased;
a synchronous switch enable logic circuit that is arranged to provide a synchronous switch control signal based, in part, on the synchronous switch enable signal and the first switch control signal, wherein the synchronous switch control signal controls opening and closing of a synchronous switch circuit; and a level shift circuit that is arranged to provide the pulse modulation control circuit input signal during the transition time interval by level-shifting the error signal down by an amount that is based on a reverse current duration.

2. The circuit of claim 1, wherein
the level shift circuit is arranged to provide the pulse modulation control circuit input signal by:
  during the transition time interval, detecting the reverse current duration, wherein the reverse current duration is the duration for which a body diode of the first switch circuit is conducting reverse current while the synchronous switch control signal corresponds to an active level; and
  in a subsequent switching cycle of the transition time interval, providing the pulse modulation control circuit input signal by level shifting the error signal based on the detected reverse current duration.

3. The circuit of claim 1, wherein the modulation parameter is the duty cycle of synchronous switch enable signal, and wherein the transition time interval occurs over at least one hundred consecutive clock cycles over which the duty cycle of the synchronous switch enable signal is gradually increased or gradually decreased.

4. The circuit of claim 1, wherein the circuit for switching regulation has at least one of a buck regulator topology, a boost regulator topology, a buck-boost regulator topology, or an inverting regulator topology.

5. The circuit of claim 1, wherein the circuit for switching regulation operates in at least one of voltage mode or current mode.

6. The circuit of claim 1, wherein
the level shift circuit is arranged to provide the pulse modulation control circuit input signal during the transition time interval by level-shifting the error signal down by an amount that is proportional to the reverse current duration, wherein the reverse current duration is the duration that a body diode of the first switch circuit is conducting reverse current.

7. The circuit of claim 6, wherein the pulse modulation control circuit includes a PWM comparator that is arranged to compare a ramp signal with the pulse modulation control circuit input signal, and to provide a pulse modulation output signal based on the comparison, wherein the switch control signal is based, at least in part, on the pulse modulation output signal, the ramp signal has a slope, and wherein the level shift circuit is arranged to perform the level-shifting such that: each time reverse current is conducted through the body diode of the first switch circuit during the transition time period, on a subsequent clock cycle of the transition time period, the level shift is substantially equal to a multiplicative product of: (1) a slope of the ramp signal and (2) the reverse current duration.

8. The circuit of claim 1, further comprising:
a sensing circuit that is arranged to provide a sensing circuit output signal such that:
  if an inductor current of an inductor is less than zero while the synchronous switch is on, then sensing output signal is asserted at the next rising pulse of a switch signal at a switch node, and de-asserted at the next falling pulse of the switch signal that proceeds the rising pulse of the switch signal, wherein the circuit for switching regulation is arranged to operate with the first switch circuit, the synchronous switch circuit, and the inductor coupled together at the switch node.

9. The circuit of claim 8, wherein
the level shift circuit is arranged to provide the pulse modulation control circuit input signal such that, each time a pulse occurs in the sensing circuit output signal, in a subsequent switching cycle of the transition time interval, the pulse modulation control signal is provided by level shifting the error signal down such that the level shift is proportional to an on-time of the pulse.

10. The circuit of claim 8, further comprising:
a duration-to-current converter that is arranged to provide a level-shift circuit input current to the level shift circuit such that, each time a pulse occurs in the sensing circuit output signal, in a subsequent switching cycle of the transition time interval, the level-shift circuit input current is provided such that the level-shift circuit input current is proportional to the duration of the pulse.

11. The circuit of claim 10, wherein the duration-to-current converter is further arranged to provide the level-shift circuit input current such that the level shift input current is also proportional to a switching frequency of the pulse modulation circuit.

12. The circuit of claim 10, wherein the level-shift circuit is arranged to provide the pulse modulation control signal is provided by level-shifting the error signal such that the level shift is proportional to the level-shift circuit input current.

13. A circuit for switching regulation, comprising:
a first switch circuit having at least a first control input, wherein the first switch circuit is coupled to a first node;
a synchronous switch circuit having at least a first control input, wherein the synchronous switch circuit is coupled to the first node;
an error circuit having at least an output;
a switch control circuit having at least an input, and an output that is coupled to the control input of the control input of the first switch circuit, wherein the switch control circuit includes a pulse modulation circuit;
a synchronous switch enable control circuit having at least an output;
a synchronous switch enable logic circuit having at least an output that is coupled to the control input of the synchronous switch circuit, and a first input that is coupled to the output of the switch control circuit, and a second input that is coupled to the output of the synchronous switch enable control circuit;
a level shift circuit having at least a first input that is coupled to the output of the error circuit, and an output that is coupled to the input of the switch control circuit; and
a reverse current duration detection circuit having at least an output that is coupled to the level shift circuit.

14. The circuit of claim 13, wherein the synchronous switch enable control circuit is arranged to provide a synchronous switch enable signal at the output of the synchronous switch enable control circuit such that, during a transition time interval, a modulation parameter of the synchronous switch enable signal is gradually increased or gradually decreased such that the circuit for switching regulation operates in Transition Conduction Mode (TCM).

15. The circuit of claim 13, further comprising:
a duration-to-current converter having at least an input that is coupled to the output of the reverse current duration detection circuit, and an output that is coupled to the level shift circuit, such that the output of the reverse current duration circuit is coupled to the level shift circuit via the duration-to-current converter.

16. A method for regulation, comprising:

opening and closing a first switch circuit based on a first switch control signal such that an output signal is regulated;

opening and closing a synchronous switch circuit based on a synchronous switch control signal;

providing the first switch control signal based, in part, on the output signal;

providing the synchronous switch control signal such that:
if the synchronous switch enable signal corresponds to an active level, and the first switch control signal corresponds to an inactive level:
the synchronous switch control signal corresponds to an active level,
else:
the synchronous switch control signal corresponds to an inactive level;

providing the synchronous switch enable signal such that, during a transition time interval that occurs over at least three consecutive switching cycles:
a parameter of the synchronous switch enable signal is gradually increased such that partially synchronous rectification is performed, and such that the partially synchronous rectification gradually approaches fully synchronous rectification; or
the parameter of the synchronous switch enable signal is gradually decreased such that the partially synchronous rectification is performed, and such that the partially synchronous rectification gradually approaches asynchronous rectification;

during the transition time interval, detecting a reverse current duration, wherein the reverse current duration is the duration for which a body diode of the first switch circuit is conducting reverse current while the first switch control signal correspond to an active level; and in a subsequent switching cycle of the transition time interval, increasing a duration for which the first switch circuit is closed based on the detected reverse current duration.

17. The method of claim 16, further comprising operating in Transition Conduction Mode TCM) during the transition time interval.

18. The method of claim 17, wherein the regulation of the output signal is buck voltage regulation, and wherein the gain Vout/Vin of the buck voltage regulation during TCM is substantially as given in the following equation:

$$\text{Gain}_{TCM} = \frac{V_{OUT}}{V_{in}} = \frac{1}{2} + \frac{D_{HS}^2}{2 \cdot K_{load}} \cdot \left(1 + \frac{2 \cdot D_{HS}}{D_{LS}}\right) - \frac{D_{HS}}{K_{load}} \cdot \sqrt{K_{load} + \left(\frac{D_{HS}}{2} - \frac{K_{load}}{2 \cdot D_{LS}}\right)^2},$$

where Vout represents a voltage of the output signal, Vin represents an input voltage, $D_{HS}$ represents a duty cycle of the first switch circuit, $D_{LS}$ represents a duty cycle of the synchronous switch circuit, and where $K_{load}$ represents a parameterized load constant.

19. The method of claim 16, wherein
providing the first switch control signal includes:
providing an error signal based, in part, on the output signal and a reference signal;
providing a pulse modulation output signal by performing pulse modulation on a pulse modulation input signal, wherein the pulse modulation input signal is based, at least in part, on the error signal; and
providing the first switch control signal based, at least in part, on the pulse modulation output signal.

20. The method of claim 19, wherein
increasing the duration for which the first switch circuit is closed based on the detected first duration is accomplished by: level-shifting the error signal to provide the pulse modulation input signal such that the level shift is proportional to the detected first duration.

* * * * *